(12) United States Patent
Doylend

(10) Patent No.: US 7,532,789 B1
(45) Date of Patent: May 12, 2009

(54) PROCESS TOLERANT PLANAR RING RESONATOR DISPERSION COMPENSATOR

(75) Inventor: Jonathan K. Doylend, Dundas (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/005,855

(22) Filed: Dec. 28, 2007

(51) Int. Cl.
*G02B 6/26* (2006.01)

(52) U.S. Cl. .................. 385/27; 385/39; 385/50

(58) Field of Classification Search .......... None
See application file for complete search history.

(56) References Cited

U.S. PATENT DOCUMENTS

2003/0086638 A1* 5/2003 Frolov et al. ............. 385/17
2003/0202743 A1* 10/2003 Shibata .................. 385/27

OTHER PUBLICATIONS

Takahashi, Hidenori et al., "Expansion of Bandwidth of Tunable Dispersion Compensator Based on Ring Resonators Utilizing Negative Group Delay", *Journal of Lightwave Technology*, vol. 24, No. 6, (Jun. 2006), pp. 2276-2286.

Takahashi, Hidenori et al., "Tunable Chromatic Dispersion Compensator Utilizing Silica Waveguide Ring Resonator Having Mach-Zehnder Interferometric Variable Coupler Eliminating Crossing Point of Waveguides", *IEEE/LEOS Annual Meeting Conference Proceedings. 2*, (2002), pp. 665-666.

Madsen, C.K. et al., "Integrated All-Pass Filters for Tunable Dispersion and Dispersion Slope Compensation", *IEEE Photonics Technology Letters*, vol. 11, No. 12, (Dec. 1999), pp. 1623-1625.

* cited by examiner

*Primary Examiner*—Sung H Pak
*Assistant Examiner*—Mike Stahl
(74) *Attorney, Agent, or Firm*—Ryder IP Law; Douglas J. Ryder

(57) ABSTRACT

In general, in one aspect, an apparatus includes an optical bus arm and a ring resonator arm. The apparatus also includes first, second and third directional couplers between the optical bus arm and the ring resonator arm. A first tuner is included on one of the optical bus arm and the ring resonator arm between the first directional coupler and the second directional coupler. A second tuner is included on other of the optical bus arm and the ring resonator arm between the second directional coupler and the third directional coupler. A tuning mechanism is also included.

15 Claims, 4 Drawing Sheets

*FIG. 1 (TYPICAL MZI COMPENSATOR)*

PROCESS TOLERANT PLANAR RING RESONATOR DISPERSION COMPENSATOR

BACKGROUND

Optical dispersion compensators are utilized to reduce amplitude distortion of received optical signals and thus increase the useable bandwidth of the optical signal. Dispersion compensators based on ring resonators may reduce amplitude distortion by over coupling (e.g., coupling coefficient (K) approaching 1) the signal received on a bus to the ring resonator in order to reduce the bandwidth limitations associated with a sharp resonance peak. In general, coupling to the bus must be greater than 90% for a planar ring resonator dispersion compensator (ring compensators) to be practical for dispersion compensation.

A ring compensator using a single directional coupler to couple the optical signals received on the bus to the ring resonator would require the directional coupler to have a coupling coefficient (k) equal to at least 90% to provide sufficient coupling for dispersion compensation. A ring compensator using a Mach-Zehnder interferometer (MZI) composed of two directional couplers with a means of tuning the optical path length of one of the arms between the couplers to allow arbitrary coupling between the bus and the ring resonator requires the directional couplers to have k in the range of 34% and 66%. However, the k of the directional couplers in planar optical circuits is highly dependent on process variables such as etch depth and sidewall angle.

BRIEF DESCRIPTION OF THE DRAWINGS

The features and advantages of the various embodiments will become apparent from the following detailed description in which.

DETAILED DESCRIPTION

Figure 1:
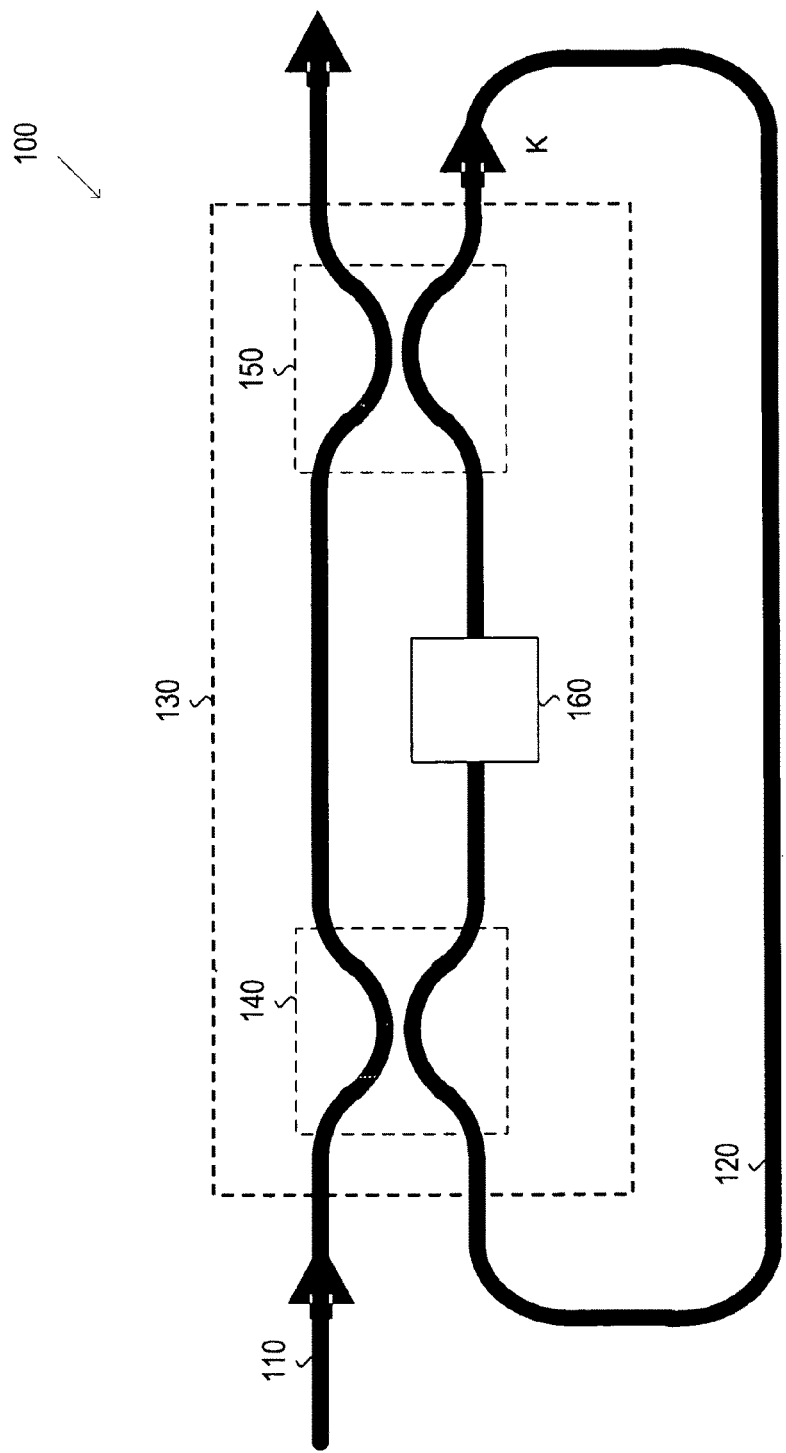
FIG. 1 illustrates a typical ring resonator optical dispersion compensator utilizing a Mach-Zehnder interferometer (MZI)

FIG. 1 illustrates a typical ring resonator optical dispersion compensator utilizing a Mach-Zehnder interferometer (MZI). The typical MZI compensator 100 includes a bus receiving the optical signal 110, a ring resonator 120, and the MZI 130. The MZI 130 has two arms (one for the bus, one for the ring resonator) and includes two directional couplers 140, 150 between the two arms and a tuner 160 on one arm (e.g., the ring resonator arm 120) between the couplers 140, 150.

The first coupler 140 modifies (e.g., adjust the amplitude, frequency, phase) the optical signal received on the bus 110 by coupling (e.g., transferring portions of the signal) the signal to the ring resonator 120 or vice versa. The tuner 160 is then used to tune the phase of the signal on the ring resonator 120 to create a phase difference between the signals output from the first coupler 140. The second coupler 150 modifies the optical signal on the bus 110 by coupling the signal to the adjusted signal on the ring resonator 120 or vice versa. The output of the second coupler 150 on the bus 110 is the signal compensated for dispersion based on the overall coupling of the signal to the ring resonator 120 (the coupling coefficient K of the MZI 130).

The overall coupling K between the bus and the ring resonator for the typical MZI compensator 100 is based on the coupling coefficient (k) of the directional couplers 140, 150 and the phase difference generated by the tuner 160. Optimal coupling (e.g., coupling K>90%) of the compensator 100 over the tuning range may not be possible if the k values of the couplers 140 and 150 are more than 16% off a 50% target value (not between 34% and 66%). The directional couplers in planar optical circuits are highly dependent on process variables that determine waveguide shape and separation (e.g. etch depth and sidewall angle for the case of rib waveguides). Accordingly, the typical MZI compensator 100 is process dependent.

Figure 2:
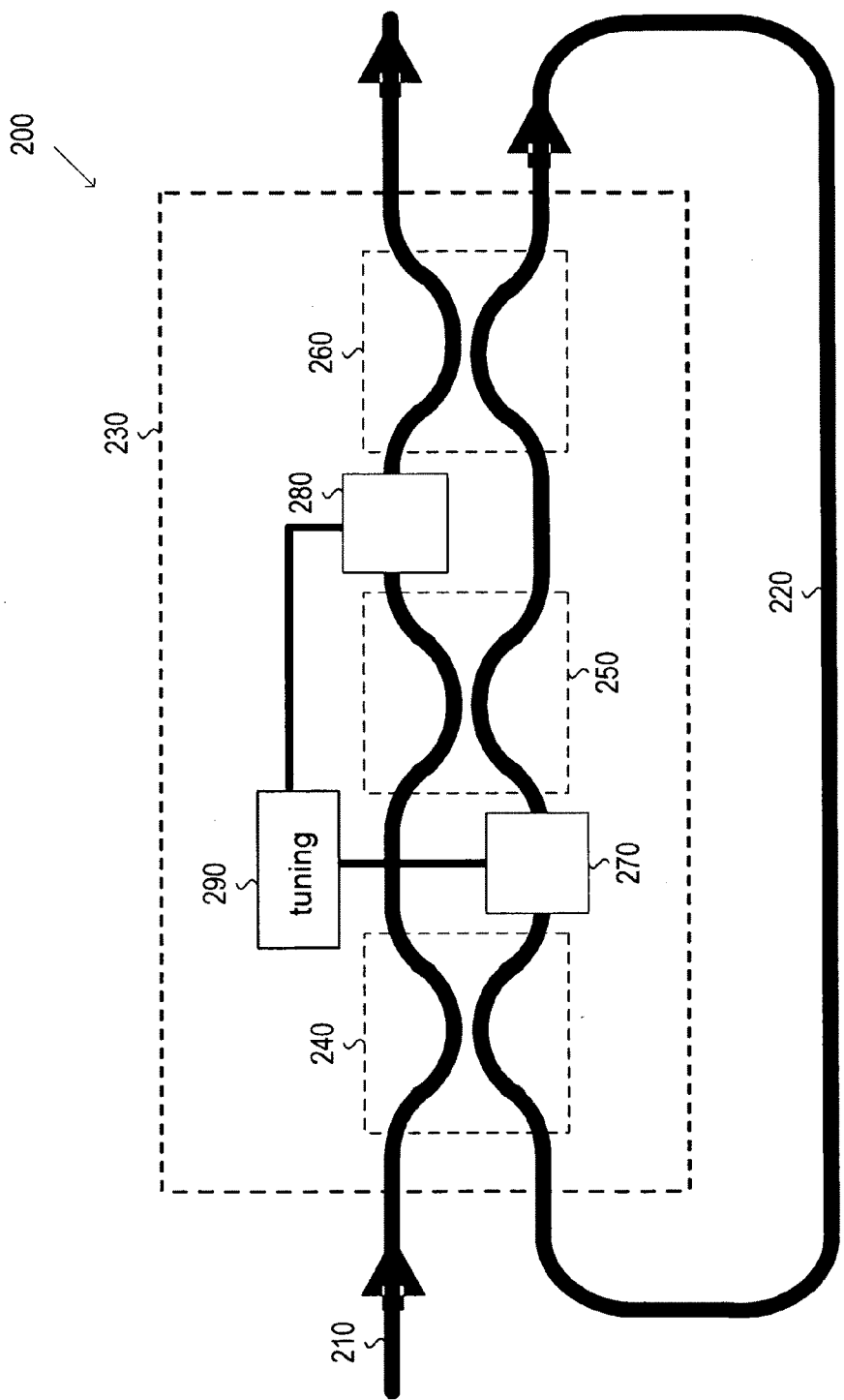
FIG. 2 illustrates an example ring resonator optical dispersion compensator utilizing a process tolerant coupler, according to one embodiment.

FIG. 2 illustrates an example process tolerant ring resonator optical dispersion compensator according to one embodiment. The compensator 200 includes a bus receiving the optical signal 210, a ring resonator 220, and a coupling architecture 230. The coupling architecture 230 includes two arms (one for the bus, one for the ring resonator) and three directional couplers 240, 250, 260 and two tuners 270, 280. The first tuner 270 is located on one arm (e.g., the ring resonator arm 220) between the first and second couplers 240, 250 and the second tuner 280 is located on the other arm (e.g., the bus arm 210) between the second and third couplers 250, 260. The tuners 270, 280 may be controlled in unison by a single tuning mechanism 290.

The first coupler 240 couples signals on the bus 210 and the ring resonator 220. The phase between the signals output from the first coupler 240 may be modified (e.g., phase difference created) by the first tuner 270 which may tune the phase of the signal on the ring resonator arm 220. The second coupler 250 may couple the signals on the bus arm 210 and the ring resonator arm 220 having the tunable phase difference therebetween. The phase between the signals output from the second coupler 250 may be modified by the second tuner 280 which may tune the phase of the signal on the bus arm 210. The third coupler 260 may couple the signals on the bus arm 210 and the ring resonator arm 220 having the tunable phase difference therebetween. The output of the third coupler 260 on the bus 210 is the signal compensated for dispersion based on the overall coupling of the signal to the ring resonator 220 (the coupling coefficient K of the coupling architecture 230).

The compensator 200 may be formed from rib waveguides in silicon, with metal heaters positioned over the various arms of the waveguides between the couplers to tune the effective index thereof.

The coupling architecture 230 (multiple tuners 270, 280 tuned in unison on opposite arms between the directional couplers 240, 250, 260) between the bus waveguide and the ring resonator enables optimal coupling for dispersion compensation (e.g., >90%) to be achieved over a wide range of directional coupler values (and hence process variables) without adding scattering loss from crossed waveguides. Accordingly, the compensator 200 allows for improved on-chip optical dispersion compensation for high-speed optical interconnects with relaxed fabrication tolerances.

Figure 3:
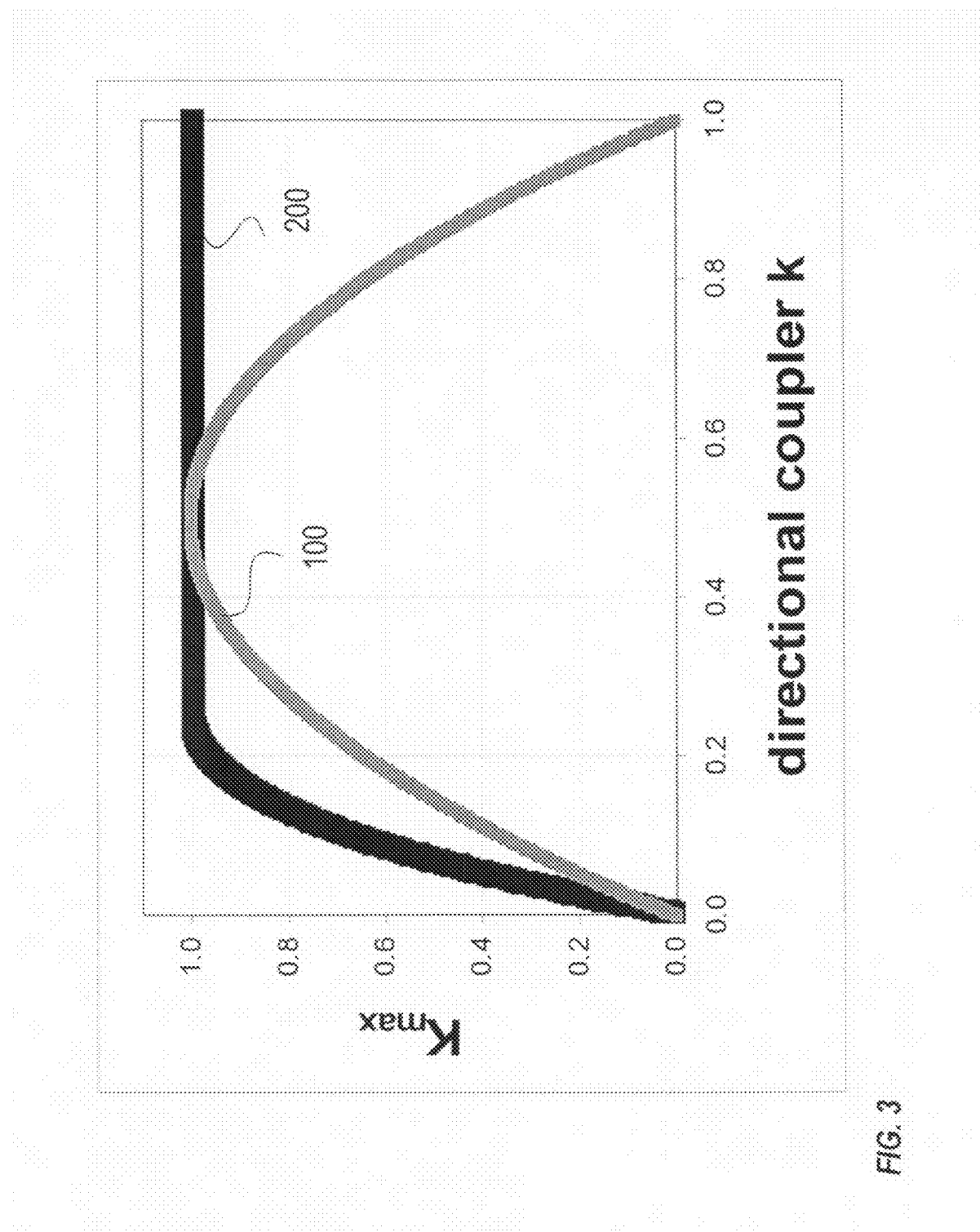
FIG. 3 is a graph comparing example K values obtained based on k values used for the typical MZI compensator and the planar tolerant compensator of FIG. 2.

FIG. 3 is a graph comparing example K values obtained based on k values used for the typical MZI compensator 100 and the planar tolerant compensator 200. As illustrated, the planar tolerant compensator 200 may obtain an optimal K (e.g., K>90%) for a wide range of k (e.g., k>20%) where the typical compensator 100 obtains the optimal K only for values of k centered around 50% (e.g., 34%<k<66%).

Figure 4:
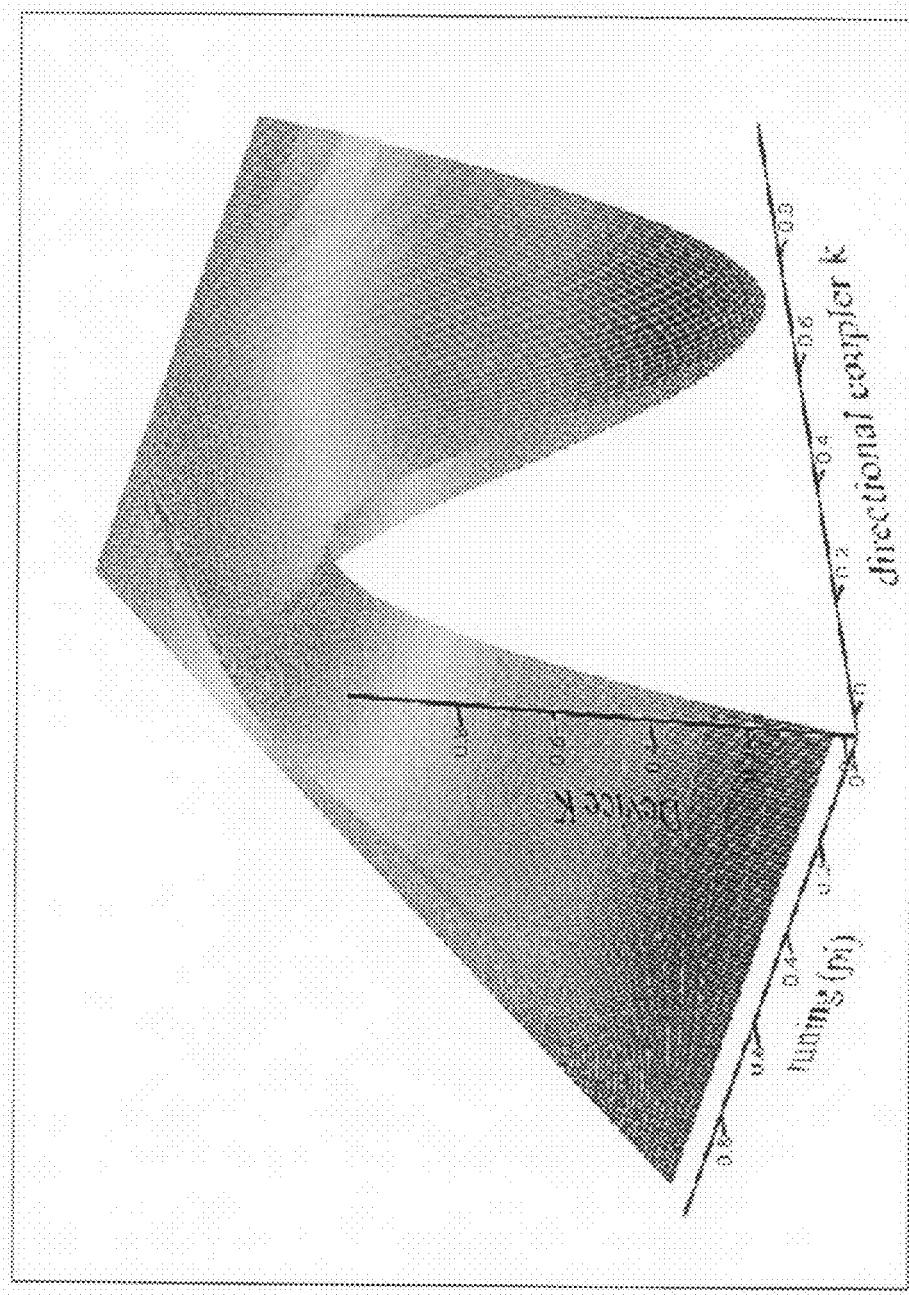
FIG. 4 is a graph of example K values calculated based on k values used and tuning for the example planar tolerant compensator of FIG. 2.

FIG. 4 is a graph of example K values calculated based on k values used and phase tuning for the example planar tolerant compensator 200. As illustrated, K may be tuned over a wide range (e.g., 0-100%) for certain k (e.g., 75%) and may be locked to a certain K (e.g., 100%) regardless of tuning for other k (e.g., 100%). For all k greater than 0.2 a high value of K (0.9 or greater) may be achieved by tuning.

The compensator 200 may also be used as an amplifier, (e.g. a Raman amplifier) in which it is desirable to achieve the same goal, namely to couple more than 90% of the signal from the bus to the ring resonator in order to avoid bandwidth limitations and consequent signal distortion. The amplifier may include a means for increasing the gain of either the bus or the ring. The compensator 200 may be used to optimize amplifier (e.g. silicon Raman amplifier) performance by choosing k (e.g., close to 75%) for the pump wavelength to enable a wide tuning range for critical coupling of the pump and k (e.g., close to 100%) for the signal wavelength such that K is locked at 100% for the signal regardless of the tuning done to optimize the pump. Raman amplifier operation can thus be optimized simultaneously with respect to both the signal and the pump.

It should be noted that the embodiment described above focused on the tuners 270, 280 being controlled in unison, but are not limited thereto. The tuners could be tuned independently without departing from the current scope. The use of independent tuning may expand the range of coupling values (and process variations) that can be used to obtain optimal coupling but may make tuning more complex (e.g., require a tuning mechanism for each arm).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An apparatus comprising
   an optical bus arm;
   a ring resonator arm;
   first, second and third directional couplers between the optical bus arm and the ring resonator arm;
   a first tuner on one of the optical bus arm and the ring resonator arm between the first directional coupler and the second directional coupler;
   a second tuner on other of the optical bus arm and the ring resonator arm between the second directional coupler and the third directional coupler; and
   a tuning mechanism,
   wherein portions of the optical bus arm and the ring resonator arm traversing the first directional coupler, the first tuner, the second directional coupler, the second tuner and the third directional coupler are symmetrical, and wherein tuning on opposite arms between successive pairs of the first, the second, and the third couplers enables the apparatus to provide dispersion compensation with limited amplitude distortion when the first, second and third directional couplers have a wide range of coupling coefficients.

2. The apparatus of claim 1, wherein the tuning mechanism tunes the first tuner and the second tuner in unison.

3. The apparatus of claim 1, wherein the first and the second tuners are to modify phase difference between signals of the bus arm and signals on the ring resonator arm.

4. The apparatus of claim 1, wherein the optical bus arm and the ring resonator arm are rib waveguides.

5. The apparatus of claim 4, wherein the rib waveguides are formed in silicon.

6. The apparatus of claim 4, wherein the first and second tuners are heaters positioned at appropriate portions on the rib waveguides.

7. The apparatus of claim 1, wherein the first tuner is included on the ring resonator arm and the second tuner is included on the bus arm.

8. The apparatus of claim 1, wherein the first tuner is included on the bus arm and the second tuner is included on the ring resonator arm.

9. A method comprising
   receiving an input optical signal on a bus;
   coupling the optical signal on the bus to a ring resonator to create a first bus signal and a first ring signal;
   creating a first phase difference between the first bus signal and the first ring signal, wherein the first phase difference is created by tuning one of the bus and the ring resonator;
   coupling the first bus signal and the first ring signal to create a second bus signal and a second ring signal, wherein the first bus signal and the first ring signal are out of phase by the first phase difference;
   creating a second phase difference between the second bus signal and the second ring signal, wherein the phase difference is created by tuning other one of the bus and the ring resonator; and
   coupling the second bus signal and the second ring signal to generate a third bus signal and a third ring signal, wherein the second bus signal and the second ring signal are out of phase by the second phase difference, wherein path of the bus and the ring resonator are symmetrical between point where the optical signal is coupled to the ring resonator and point where the second bus signal is coupled to the second ring signal.

10. The method of claim 9, further comprising transmitting the third bus signal as the output optical signal.

11. The method of claim 9, wherein
    creating a first phase difference includes tuning the first bus signal; and
    creating a second phase difference includes tuning the second ring resonator signal.

12. The method of claim 9, wherein
    creating a first phase difference includes tuning of the first ring resonator signal; and
    creating a second phase difference includes tuning of the second bus signal.

13. The method of claim 12, wherein
    the tuning of the first ring resonator signal includes adjusting heat on the ring resonator arm between the first coupling and the second coupling; and
    the tuning of the second bus signal includes adjusting heat on the bus arm between the second coupling and the third coupling.

14. The method of claim 13, wherein the tuning of the first ring resonator signal and the tuning of the second bus signal are tuned in unison.

15. The method of claim 9, further comprising amplifying the third ring signal using some means of achieving gain within the ring resonator.

* * * * *